US008299748B2

(12) United States Patent
Soma et al.

(10) Patent No.: US 8,299,748 B2
(45) Date of Patent: Oct. 30, 2012

(54) VEHICLE, VEHICLE CONTROL METHOD AND COMPUTER-READABLE RECORDING MEDIUM BEARING PROGRAM FOR CAUSING COMPUTER TO EXECUTE THE VEHICLE CONTROL METHOD

(75) Inventors: Takaya Soma, Toyota (JP); Takeshi Mogari, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 12/312,986

(22) PCT Filed: Dec. 26, 2007

(86) PCT No.: PCT/JP2007/075389
§ 371 (c)(1),
(2), (4) Date: Jun. 3, 2009

(87) PCT Pub. No.: WO2008/081982
PCT Pub. Date: Jul. 10, 2008

(65) Prior Publication Data
US 2010/0063675 A1  Mar. 11, 2010

(30) Foreign Application Priority Data
Jan. 4, 2007  (JP) ................................. 2007-000115

(51) Int. Cl.
*H02J 7/00* (2006.01)
(52) U.S. Cl. ....................................... 320/104; 320/107
(58) Field of Classification Search .................. 320/104, 320/107
See application file for complete search history.

(56) References Cited

U.S. PATENT DOCUMENTS

| 5,272,431 A | 12/1993 | Nee |
| 6,701,064 B1 | 3/2004 | De Haan et al. |

FOREIGN PATENT DOCUMENTS

| EP | 1 416 142 A1 | 5/2004 |
| JP | A-05-095607 | 4/1993 |
| JP | A-08-154307 | 6/1996 |
| JP | A-10-056741 | 2/1998 |
| JP | A-10-178701 | 6/1998 |
| JP | A-10-262303 | 9/1998 |
| JP | A-2002-369315 | 12/2002 |
| JP | A-2003-023378 | 1/2003 |
| JP | A-2006-074867 | 3/2006 |
| RU | 2048309 C1 | 11/1995 |
| RU | 2113366 C1 | 6/1998 |
| RU | 2 233 011 C2 | 7/2004 |

OTHER PUBLICATIONS

Russian Office Action issued in Russian Patent Application No. 2009129680 dated Oct. 19, 2010 (with translation).
Office Action issued in Russian Patent Application No. 2009129680/11, dated Jul. 9, 2010 (with translation).
Sep. 26, 2011 Search Report issued in European Patent Application No. 07860584.7.

*Primary Examiner* — Bot Ledynh
(74) *Attorney, Agent, or Firm* — Oliff & Berridge, PLC (57) ABSTRACT

In response to detection of connection between a power supply outside a vehicle and a charge plug, control device invalidates key verification performed for determining whether a key of a user is regular or not, when a shift position is parking and a parking brake is active. This satisfies system start conditions, and the control device turns on respective relays to start a system, and executes charge control for charging a power storage device from the power supply outside the vehicle.

9 Claims, 5 Drawing Sheets

VEHICLE, VEHICLE CONTROL METHOD AND COMPUTER-READABLE RECORDING MEDIUM BEARING PROGRAM FOR CAUSING COMPUTER TO EXECUTE THE VEHICLE CONTROL METHOD

TECHNICAL FIELD

The present invention relates to a vehicle equipped with a power storage device that can be charged from a power supply outside the vehicle, a control method for the vehicle and a computer-readable recording medium bearing a program for causing a computer to execute the control method for the vehicle.

BACKGROUND ART

Japanese Patent Laying-Open No. 10-56741 has disclosed a battery charging structure of a small electric vehicle that allows charging of a battery from a power supply outside the vehicle. In this battery charging structure, when a power cord for charging is pulled out from a cord reel while a main switch is off, control for charging the battery starts in response to such pulling.

According to this battery charging structure, it is not necessary to switch the control between running control and charging control by a dedicated switch or the like so that an operation can be simple, and such an error can be prevented that the vehicle runs during a charging operation.

However, in order to prevent theft or the like, the vehicle has generally employed security measures, e.g., to prevent starting of a vehicle system when a key is not verified. The technique disclosed in Japanese Patent Laying-Open No. 10-56741 is effective at saving time and effort required for starting the system for the charging, but this publication has not particularly discussed a relationship of the system start for the charging with respect to functions employed as the security measures for the system start.

DISCLOSURE OF THE INVENTION

Accordingly, an object of the invention is to provide a vehicle equipped with a power storage device that can be charged from a power supply outside the vehicle, achieving simplified system start-up at the time of charging and adapted to already-existing security measures.

Another object of the invention is to provide a control method employed in a vehicle equipped with a power storage device that can be charged from a power supply outside the vehicle, achieving simplified system start-up at the time of charging and adapted to already-existing security measures as well as a computer-readable recording medium bearing a program for causing a computer to execute the control method.

According to the invention, a vehicle includes a power storage device capable of being charged, a charge plug, a charging unit, a connection detecting unit, an authenticating unit and a control unit. The charge plug receives an electric power for charging the power storage device from a power supply outside the vehicle. The charging unit is configured to be capable of receiving the electric power input from the charge plug and charging the power storage device. The connection detecting unit detects connection or disconnection between the charge plug and the power supply. The authenticating unit determines whether a user is a regular user or not, and allows starting of a vehicle system when it is determined that the user is the regular user. The control unit invalidates a result of the determination by the authenticating unit and instructs the charging unit to execute the charging of the power storage device from the power supply, when the connection detecting unit detects the connection between the charge plug and the power supply during stop of the vehicle system.

Preferably, the authenticating unit determines whether a key possessed by a user is regular or not, and allows the starting of the vehicle system when the authenticating unit determines that the key is regular.

Preferably, the control unit validates the determination result of the authenticating unit when the connection detecting unit detects the disconnection between the charge plug and the power supply.

Preferably, the control unit validates the determination result of the authenticating unit when it is determined that the charging of the power storage device from the power supply is completed.

Preferably, the vehicle further includes a shift position detecting unit. The shift position detecting unit detects a shift position of a shift lever. The control unit invalidates the determination result of the authenticating unit and instructs the charging unit to execute the charging of the power storage device from the power supply, only when the shift position detecting unit detects that the shift lever is set in a predetermined shift position allowing the charging of the power storage device from the power supply.

Further preferably, the predetermined shift position is a parking position.

Also, according to the invention, a control method is a control method for a vehicle allowing charging of a power storage device mounted on the vehicle from a power supply outside the vehicle. The vehicle includes an authenticating unit. The authenticating unit determines whether a user is a regular user or not, and allows starting of a vehicle system when it is determined that the user is the regular user. The control method includes first to third steps. In the first step, connection between a charge plug for receiving an electric power for charging the power storage device and the power supply is detected. In the second step, a result of the determination by the authenticating unit is invalidated when the connection between the charge plug and the power supply is detected during stop of the vehicle system. In the third step, charging of the power storage device from the power supply is executed when the determination result of the authenticating unit is invalidated in the second step.

Preferably, the authenticating unit determines whether a key possessed by a user is regular or not, and allows the starting of the vehicle system when the authenticating unit determines that the key is regular.

Preferably, the control method further includes a fourth step. In the fourth step, the determination result of the authenticating unit is validated when disconnection between the charge plug and the power supply is detected.

Preferably, the control method further includes a fifth step. In the fifth step, the determination result of the authenticating unit is validated when it is determined that the charging of the power storage device from the power supply is completed.

Preferably, the control method further includes a sixth step. In the sixth step, it is determined whether a shift lever is set in a predetermined shift position allowing the charging of the power storage device from the power supply or not. The determination result of the authenticating unit is invalidated in the second step only when it is determined in the sixth step that the shift lever is set in the predetermined shift position.

Further preferably, the predetermined shift position is a parking position.

In addition, according to the present invention, the recording medium bears a program for causing a computer to execute any control method described above.

In this invention, the power storage device can be charged from the power supply outside the vehicle. This invention includes the authenticating unit that allows the starting of the vehicle system when it is determined that the user is the regular user. Further, the determination result of the authenticating unit is invalidated when the connection between the charge plug and the power supply is detected during stop of the vehicle system. Therefore, a conventional system starting operation requiring the authentication is avoided.

According to the invention, therefore, the authenticating unit can execute the security measures for the ordinary system starting at the time of vehicle running, and the system starting operation can be simple for the system starting at the time of charging.

BEST MODES FOR CARRYING OUT THE INVENTION

Embodiments of the invention will now be described with reference to the drawings. In the following description, the same or corresponding portions bear the same reference numbers, and description thereof is not repeated.

Figure 1:
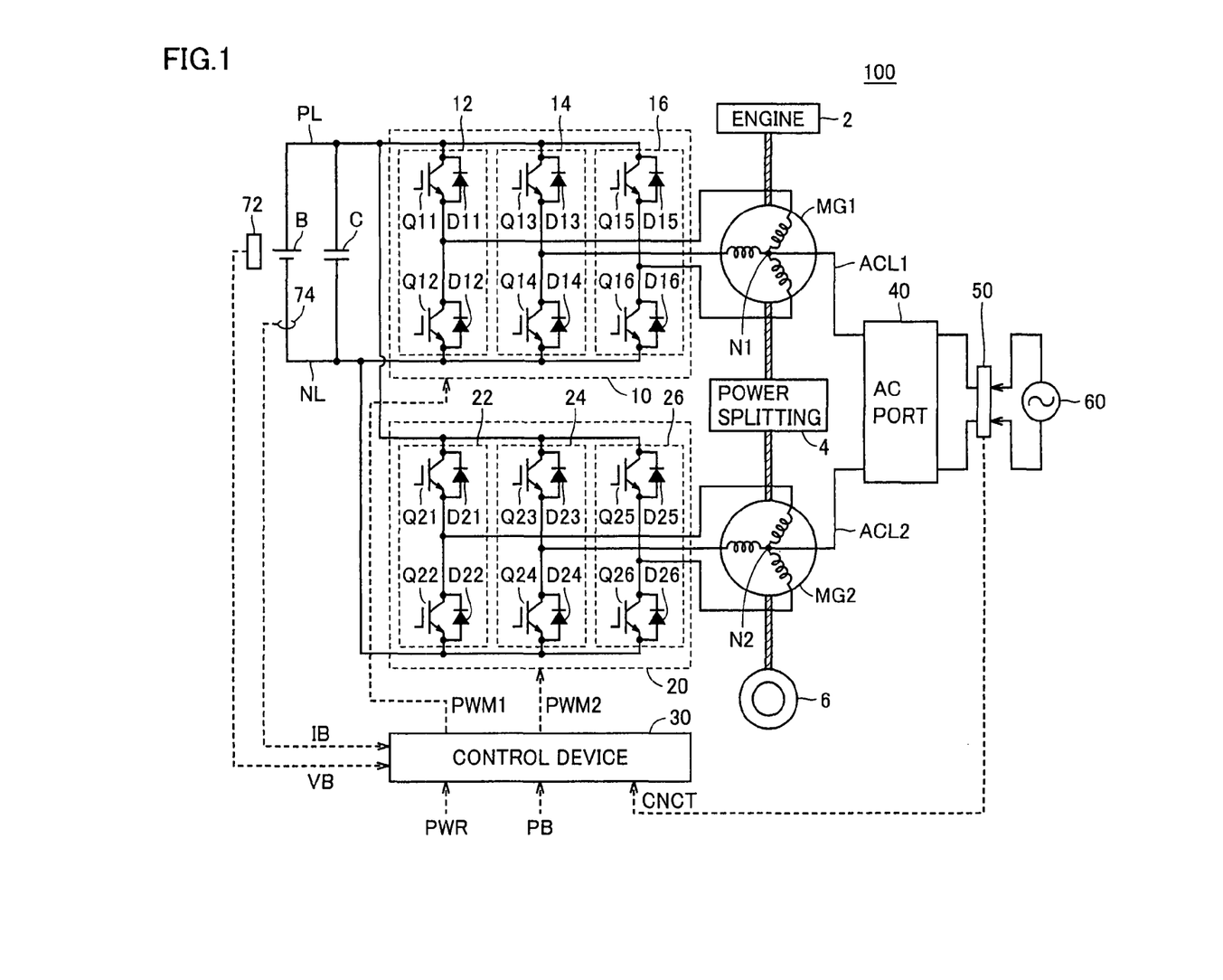
FIG. 1 is an overall block diagram of a vehicle according to an embodiment of the present invention.

FIG. 1 is an overall block diagram of a hybrid vehicle that is an example of a vehicle according to an embodiment of the invention. Referring to FIG. 1, a hybrid vehicle 100 includes an engine 2, motor generators MG1 and MG2, a power splitting mechanism 4 and wheels 6. Hybrid vehicle 100 also includes a power storage device B, a positive line PL, a negative line NL, a capacitor C, inverters 10 and 20, a control device 30, a voltage sensor 72 and a current sensor 74. Hybrid vehicle 100 further includes power lines ACL1 and ACL2, an AC port 40 and a charge plug 50.

Power splitting mechanism 4 is coupled between engine 2 and motor generators MG1 and MG2 for distributing a power among them. For example, power splitting mechanism 4 may be formed of a planetary gear having three rotation axes, i.e., a sun gear, a planetary carrier and a ring gear. These three rotation axes are connected to rotation axes of engine 2 and motor generators MG1 and MG2, respectively. For example, motor generator MG1 has a hollow rotor, and a crank shaft of engine 2 coaxially extends therethrough so that engine 2 and motor generators MG1 and MG2 can be mechanically connected to power splitting mechanism 4.

Power splitting mechanism 4 distributes the power generated by engine 2 to wheels 6 and motor generator MG1. Thus, engine 2 is arranged in hybrid vehicle 100 as a power source driving wheels 6 as well as motor generator MG1. Motor generator MG1 is arranged in hybrid vehicle 100 as an electric power generator driven by engine 2 as well as an electric motor that can crank engine 2. Motor generator MG2 is arranged in hybrid vehicle 100 as a drive power source driving wheels 6.

As will be described later, hybrid vehicle 100 can charge power storage device B from a power supply 60 by connecting charge plug 50 to a socket supplied with the power from power supply 60 (e.g., commercial AC power supply) outside the vehicle.

Power storage device B has positive and negative terminals connected to positive and negative lines PL and NL, respectively. Capacitor C is connected between positive and negative lines PL and NL. Inverter 10 includes U-, V- and W-phase arms 12, 14 and 16, which are connected in parallel between positive and negative lines PL and NL. U-phase arm 12 is formed of switching elements Q11 and Q12 connected in series, V-phase arm 14 is formed of switching elements Q13 and Q14 connected in series and W-phase arm 16 is formed of switching elements Q15 and Q16 connected in series. Diodes D11-D16 are connected in anti-parallel to switching elements Q11-Q16, respectively. Inverter 20 includes U-, V- and W-phase arms 22, 24 and 26. Inverter 20 has substantially the same structure as inverter 10.

For example, IGBTs (Insulated Gate Bipolar Transistors) or power MOSFETs (Metal Oxide Semiconductor Field-Effect Transistors) may be used as the foregoing switching elements.

Motor generator MG1 includes Y-connected three-phase coils each having an end that is connected to the ends of the other coils to form a neutral point N1. Motor generator MG2 likewise includes Y-connected three-phase coils each having one end that is connected to the ends of the other coils to form a neutral point N2. Power lines ACL1 and ACL2 are connected to neutral points N1 and N2, respectively. The other ends of power lines ACL1 and ACL2 are connected to charge plug 50 via AC port 40.

Power storage device B is a chargeable DC power supply, and is formed of a secondary battery such as a nickel hydrogen battery or a lithium ion battery. Power storage device B supplies the electric power to inverters 10 and 20, and is charged with a regenerative power provided from inverters 10 and/or 20. Power storage device B may be formed of a capacitor of a large capacitance.

Voltage sensor 72 senses a voltage VB of power storage device B, and provides a sensed value to control device 30. Current sensor 74 senses a current IB supplied to/from power storage device B, and provides a sensed value to control device 30. Capacitor C smoothes a voltage between positive and negative lines PL and NL.

Each of inverters 10 and 20 is formed of a three-phase bridge circuit. Based on a signal PWM1 from control device 30, inverter 10 converts the DC voltage supplied from power storage device B into a three-phase AC voltage, and provides it to motor generator MG1. Inverter 10 converts an AC voltage generated by motor generator MG1 using the power of engine 2 into a DC voltage, and provides it to positive and negative lines PL and NL.

Based on a signal PWM2 from control device 30, inverter 20 converts the DC voltage supplied from power storage device B into a three-phase AC voltage, and provides the converted three-phase AC voltage to motor generator MG2. When regenerative braking of the vehicle is performed, inverter 20 converts the three-phase AC voltage generated by motor generator MG2 using a rotational power of wheels 6 into a DC voltage, and provides it to positive and negative lines PL and NL.

When charge plug 50 is connected to power supply 60 and the charging of power storage device B from power supply 60 starts, inverters 10 and 20 convert the AC power that is supplied from power supply 60 to neutral points N1 and N2 via charge plug 50, AC port 40 and power lines ACL1 and ACL2 into a DC power, and provide it to positive and negative lines PL and NL to charge power storage device B.

Each of motor generators MG1 and MG2 is a three-phase AC dynamo-electric machine, and is formed of a three-phase permanent magnet synchronous motor having a permanent magnet in a rotor. Motor generator MG1 is regeneratively driven by inverter 10, and generates a three-phase AC power using a power of engine 2 to provide it to inverter 10. For starting engine 2, motor generator MG1 is driven to perform power running by inverter 10, and cranks engine 2. Motor generator MG2 is driven by inverter 20 to perform power running, and thereby generates a drive power for driving wheels 6. When the regenerative braking of the vehicle is performed, motor generator MG2 is regeneratively driven by inverter 20 to generate a three-phase AC power using the rotational force of wheels 6, and provides it to inverter 20.

Control device 30 produces a PWM (Pulse Width Modulation) signal for driving inverter 10, and provides the produced PWM signal as signal PWM1 to inverter 10. Control device 30 also produces a PWM signal for driving inverter 20, and provides the produced PWM signal as signal PWM2 to inverter 20.

When charge plug 50 is connected to power supply 60 to charge power storage device B from power supply 60, control device 30 starts the vehicle system and controls inverters 10 and 20 to convert the AC power provided to neutral points N1 and N2 from power supply 60 into the DC power and provide it to power storage device B, in a method described later.

Although not shown, AC port 40 includes a relay connecting and disconnecting power lines ACL1 and ACL2 to/from charge plug 50, and a sensor sensing the voltage and current input from charge plug 50. For charging power storage device B from power supply 60, AC port 40 electrically connects charge plug 50 to power lines ACL1 and ACL2.

Charge plug 50 is a connection terminal for electrically connecting hybrid vehicle 100 to power supply 60. Charge plug 50 can detect the connection and disconnection to/from power supply 60, and provides a signal CNCT indicating the connection or disconnection to/from power supply 60 to control device 30.

Figure 2:
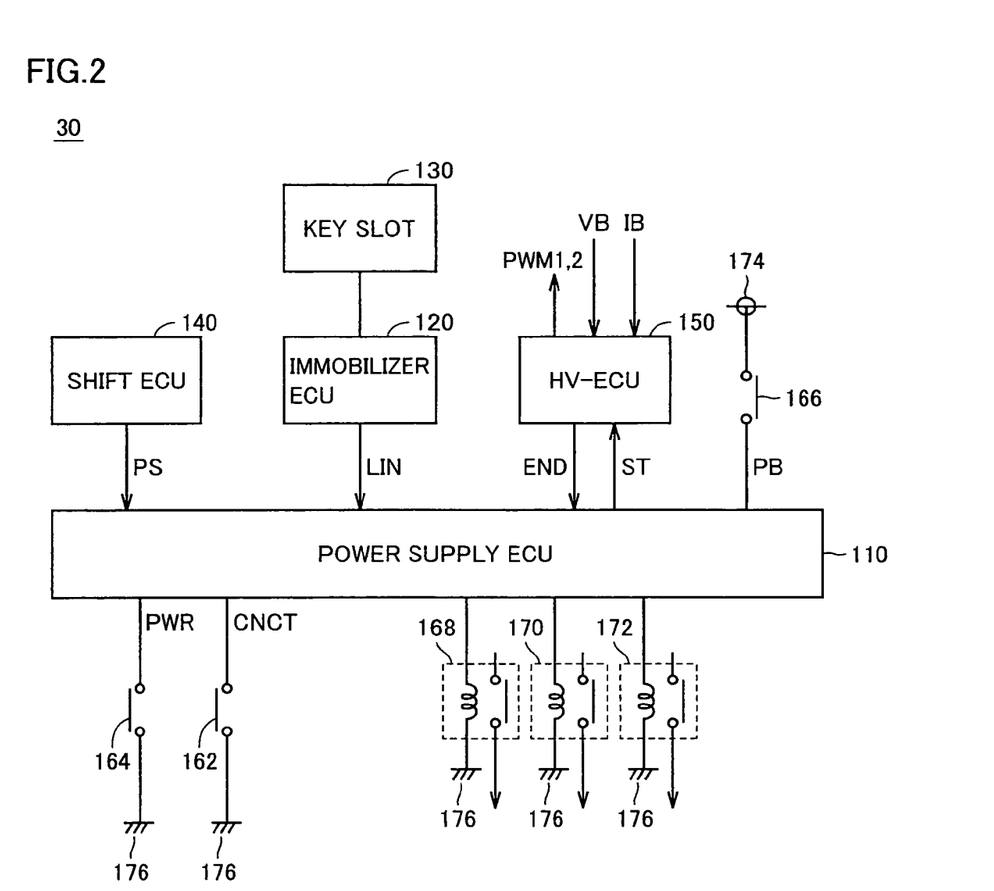
FIG. 2 is a function block diagram of a control device shown in FIG. 1.

FIG. 2 is a function block diagram of control device 30 shown in FIG. 1. Referring to FIG. 2, control device 30 includes a power supply ECU (Electronic Control Unit) 110, an immobilizer ECU 120, a key slot 130, a shift ECU 140 and an HV-ECU 150. Control device 30 further includes an ACC relay 168, an IG1 relay 170 and an IG2 relay 172.

A relay 162 is arranged in charge plug 50 (FIG. 1), and is turned on when charge plug 50 is connected to power supply 60 (FIG. 1). Power supply ECU 110 has placed a voltage on relay 162. When charge plug 50 is connected to power supply 60, signal CNCT attains an L-level (logical low level). When charge plug 50 is disconnected from power supply 60, signal CNCT attains an H-level (logical high level).

A relay 164 is turned on when a user depresses a power switch. Power supply ECU 110 likewise places a voltage on relay 164. When the user depresses the power switch, a signal PWR attains the L-level. When a parking brake is operated, a relay 166 is turned on. A power supply node 174 has placed a voltage on relay 166. When the parking brake is operated, a signal PB attains the H-level. Relays 162, 164 and 166 may be arranged in control device 30.

Key slot 130 can detect an insertion state of the key. When key slot 130 detects the insertion of the key, it provides an ID code of the key to immobilizer ECU 120. Immobilizer ECU 120 receives the ID code of the key from key slot 130. Immobilizer ECU 120 compares the received ID code with a pre-registered registration ID, and determines whether the key is a regular key or not. Immobilizer ECU 120 provides a signal LIN indicating a verification result of the ID code to power supply ECU 110.

Shift ECU 140 detects a shift position of the shift lever, and provides a signal PS indicating a detection result to power supply ECU 110. ACC relay 168, IG1 relay 170 and IG2 relay 172 are turned on/off in response to instructions provided from power supply ECU 110. Audio units, various indicator lamps, ECUs and others are connected to ACC relay 168, IG1 relay 170 and IG2 relay 172. When ACC relay 168, IG1 relay 170 and IG2 relay 172 are turned on, these units, lamps and others are supplied with the power to start the vehicle system.

Power supply ECU 110 determines, based on signal CNCT, whether charge plug 50 is connected to power supply 60 or not. Based on signal PS received from shift ECU 140, power supply ECU 110 determines the shift position of the shift lever. Further, based on signal PB, power supply ECU 110 determines whether the parking brake is set to not.

Furthermore, power supply ECU 110 invalidates signal LIN received from immobilizer ECU 120 when signal CNCT is at the L-level (connected state), signal PS indicates the parking position and signal PB is at the H-level (the parking brake is on). Thus, power supply ECU 110 invalidates the key verification by immobilizer ECU 120.

Thereby, power supply ECU 110 turns on ACC relay 168, IG1 relay 170 and IG2 relay 172 to start the vehicle system. Power supply ECU 110 activates a charge execution signal ST provided to HV-ECU 150, and instructs HV-ECU 150 to execute the charging of power storage device B from power supply 60.

When signal CNCT attains the H-level while charge execution signal ST is active, i.e., when charge plug 50 is disconnected from power supply 60 during the charging of power. storage device B from power supply 60, power supply ECU 110 executes charge ending processing. More specifically, power supply ECU 110 turns off ACC relay 168, IG1 relay 170 and IG2 relay 172, and disables the invalidation of signal LIN received from immobilizer ECU 120. Further, power supply ECU 110 likewise executes the above charge ending processing when a signal END provided from HV-ECU 150 for indicating the completion of the charging of power storage device B becomes active.

HV-ECU 150 produces signals PWM1 and PWM2 for driving inverters 10 and 20, and provides signals PWM1 and PWM2 thus produced to the switching elements of inverters 10 and 20, respectively.

When charge execution signal ST received from power supply ECU 110 is active, HV-ECU 150 controls inverters 10 and 20 to convert the AC power supplied from power supply 60 to neutral points N1 and N2 into the DC power, and provides it to power storage device B. More specifically, HV-ECU 150 produces zero-phase voltage instructions AC1 and AC2 for operating motor generators MG1 and MG2 as well as inverters 10 and 20 as a single phase PWM converter as described later, produces signals PWM1 and PWM2 based on zero-phase voltage instructions AC1 and AC2 thus produced and provides them to inverters 10 and 20, respectively.

HV-ECU 150 estimates a State Of Charge (SOC) of power storage device B based on voltage VB sensed by voltage sensor 72 (FIG. 1) and current TB sensed by current sensor 74 (FIG. 1). HV-ECU 150 determines, based on the SOC of power storage device B, whether the charging of power storage device B is completed or not. When HV-ECU 150 determines that the charging is completed, it activates signal END provided to power supply ECU 110.

Figure 3:
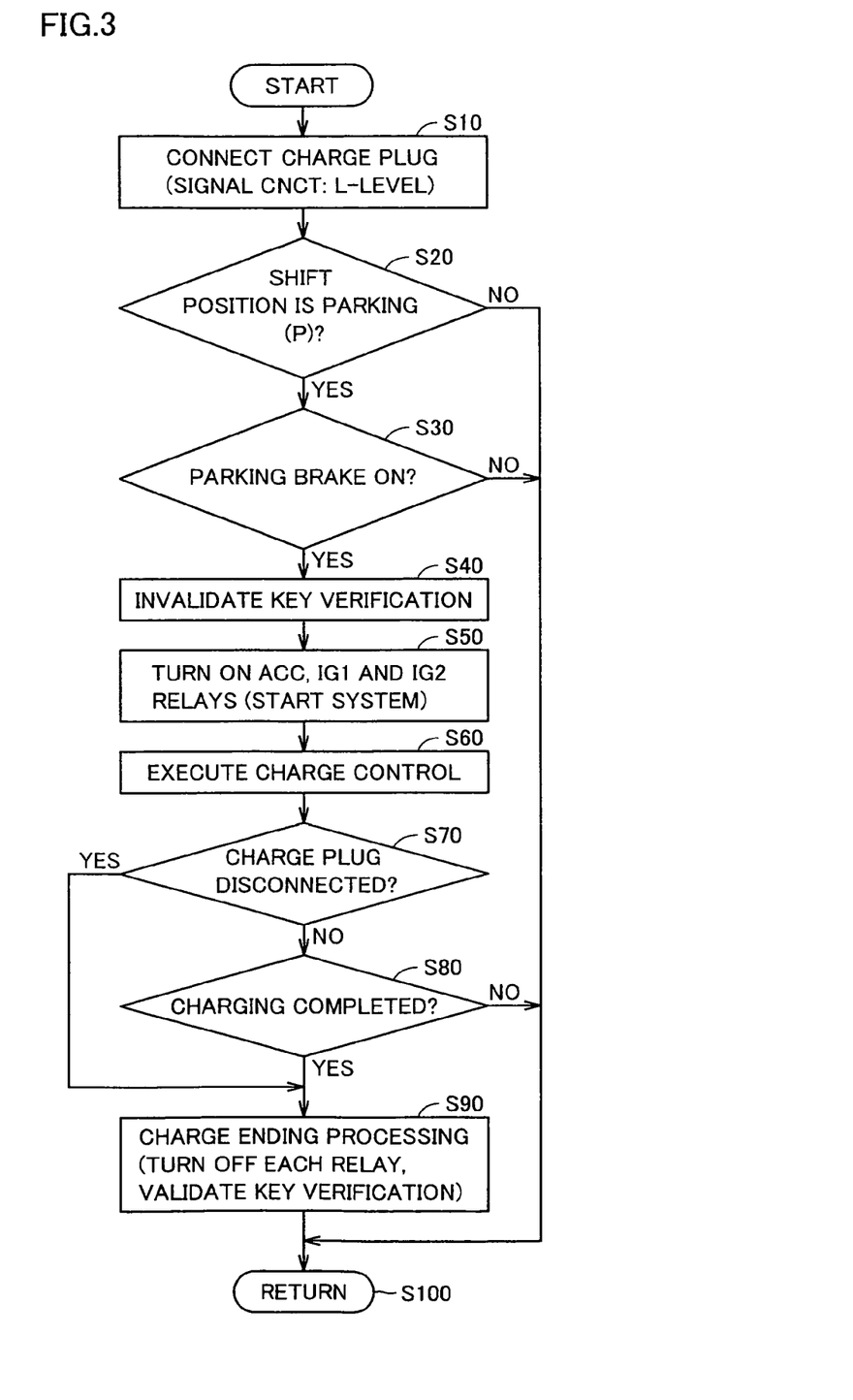
FIG. 3 is a flowchart for illustrating a control structure relating to determination about charge allowance by the control device shown in FIG. 1.

FIG. 3 is a flowchart for illustrating a control structure relating to the determination about the charge allowance by control device 30 shown in FIG. 1. Processing in this flowchart is executed at predetermined time intervals or every time predetermined conditions are satisfied.

Referring to FIG. 3, charge plug 50 is connected to power supply 60. When signal CNCT attains the L-level (step S10), control device 30 determines whether the shift position of the shift lever is parking (P) or not (step S20). When control device 30 determines that the shift position is not parking (NO in step S20), it does not execute subsequent processing, and shifts the processing to step S100.

When it is determined in step S20 that the shift position is the parking (YES in step S20), control device 30 determines based on signal PB whether the parking brake is set or not (step S30). When control device 30 determines that the parking brake is not set (NO in step S30), it does not execute subsequent processing, and shifts the processing to step S100.

When it is determined in step S30 that the parking brake is set (YES in step S30), control device 30 invalidates the key verification executed by immobilizer ECU 120 (step S40). Thereby, the system start conditions are satisfied independently of the result of the key verification, and control device 30 turns on ACC relay 168, IG1 relay 170 and IG2 relay 172 (step S50). Thereby, the vehicle system starts.

Control device 30 produces zero-phase voltage instructions AC1 and AC2 for operating motor generators MG1 and MG2 as well as inverters 10 and 20 as the single-phase PWM converter, produces signals PWM1 and PWM2 based on zero-phase voltage instructions AC1 and AC2 thus produced and provides them to inverters 10 and 20, respectively. Thereby, the charge control for charging power storage device B from power supply 60 is executed (step S60).

Then, control device 30 determines based on signal CNCT whether charge plug 50 is disconnected from power supply 60 or not (step S70). When control device 30 determines that charge plug 50 is disconnected from power supply 60 (YES in step S70), it executes the charge ending processing (step S90). More specifically, control device 30 turns off ACC relay 168, IG1 relay 170 and IG2 relay 172, and validates the key verification that was invalidated in step S40. Thereby, the vehicle system stops.

When it is determined in step S70 that charge plug 50 is connected to power supply 60 (NO in step S70), control device 30 determines based on the SOC of power storage device B whether the charging of power storage device B is completed or not (step S80). When control device 30 determines that the charging of power storage device B is completed (YES in step S80), control device 30 shifts the processing to step S90 to perform the charge ending processing already described. When it is determined that the charging of power storage device B is not yet completed (NO in step S80), control device 30 shifts the processing to step S100.

Then, description will be given on the operation of inverters 10 and 20 performed when power storage device B is charged from power supply 60.

Figure 4:
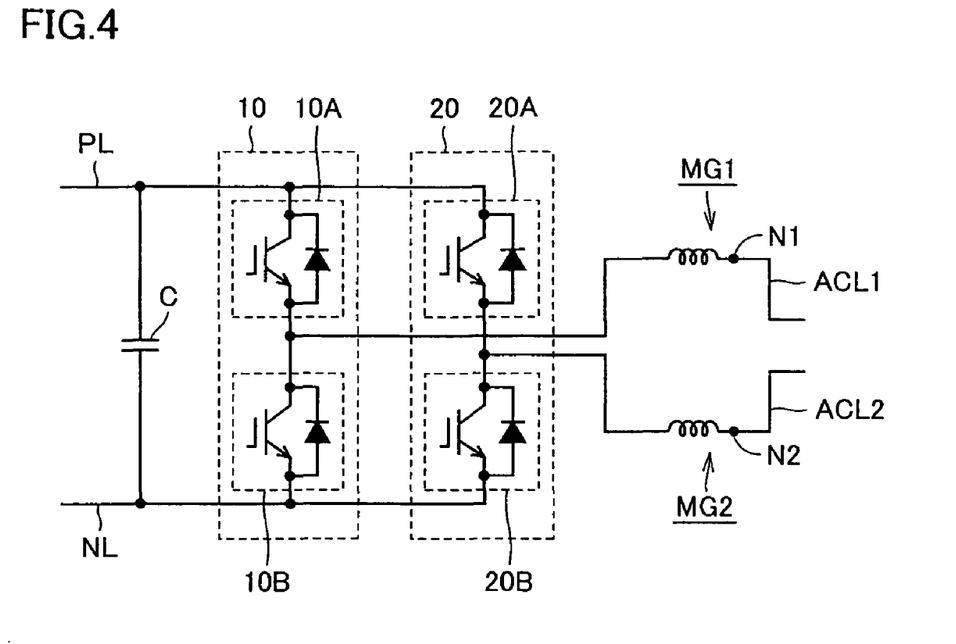
FIG. 4 shows a zero-phase equivalent circuit of inverters and motor generators shown in FIG. 1.

FIG. 4 shows a zero-phase equivalent circuit of inverters 10 and 20 as well as motor generators MG1 and MG2. In each of inverters 10 and 20 formed of the three-phase bridge circuits, respectively, the on and off of six switching elements can be combined in eight patterns. In two of the eight switching patterns, an interphase voltage is zero, and this voltage state is referred to as a "zero-voltage vector". In the zero-voltage vector, it can be deemed that three switching elements of an upper arm are in the same switching state (all on or off), and it can also be deemed that switching elements of a lower arm are in the same switching state. In FIG. 4, therefore, the three switching elements of the upper arm of inverter 10 are collectively represented as an upper arm 10A, and the three switching elements of the lower arm of inverter 10 are collectively represented as a lower arm 10B. Likewise, the three switching elements of the upper arm of inverter 20 are collectively represented as an upper arm 20A, and the three switching elements of the lower arm of inverter 20 are collectively represented as a lower arm 20B.

As shown in FIG. 4, this zero-phase equivalent circuit can be deemed as a single phase PWM converter receiving, as its input, a single-phase AC power supplied to neutral points N1 and N2 via power lines ACL1 and ACL2. In view of this, the zero voltage vector in each of inverters 10 and 20 is changed to perform the switching control so that inverters 10 and 20 may operate as the arms of the single-phase PWM converter. Thereby, the AC power supplied to power lines ACL1 and ACL2 can be converted into the DC power and can be provided to positive and negative lines PL and NL.

According to the embodiment, as described above, power storage device B can be charged from power supply 60 outside the vehicle. In this hybrid vehicle 100, the key verification is executed as the security measures at the start of the system (immobilizer function). However, when the connection between the charge plug 50 and power supply 60 is detected during the stop state of the vehicle system, the key verification is invalidated so that an ordinary system start operation including the key verification is avoided.

According to the embodiment, therefore, the key verification is executed as the security measures when the system starts ordinarily during the vehicle running, and the system start operation can be simplified when the system starts at the time of charging.

In this embodiment, when charge plug 50 is removed from power supply 60 during the charging, the key verification that was invalidated during the charging is validated. Also, when the charging of power storage device B is completed, the key verification that was likewise invalidated during the charging is validated. Therefore, this embodiment does not impede the key verification function that is executed when the ordinary start of the system is performed for the running.

In the operation of charging power storage device B from power supply 60, this embodiment invalidates the key verification only when the position of the shift lever is the parking (P) and executes the charge control. Therefore, the embodiment can reliably prevent the moving of the vehicle during the charging.

In the embodiment described above, the charging power is supplied through neutral points N1 and N2 of motor generators MG1 and MG2 when power storage device B is charged from power supply 60 outside the vehicle. However, an independent inverter dedicated to the charging may be employed.

Figure 5:
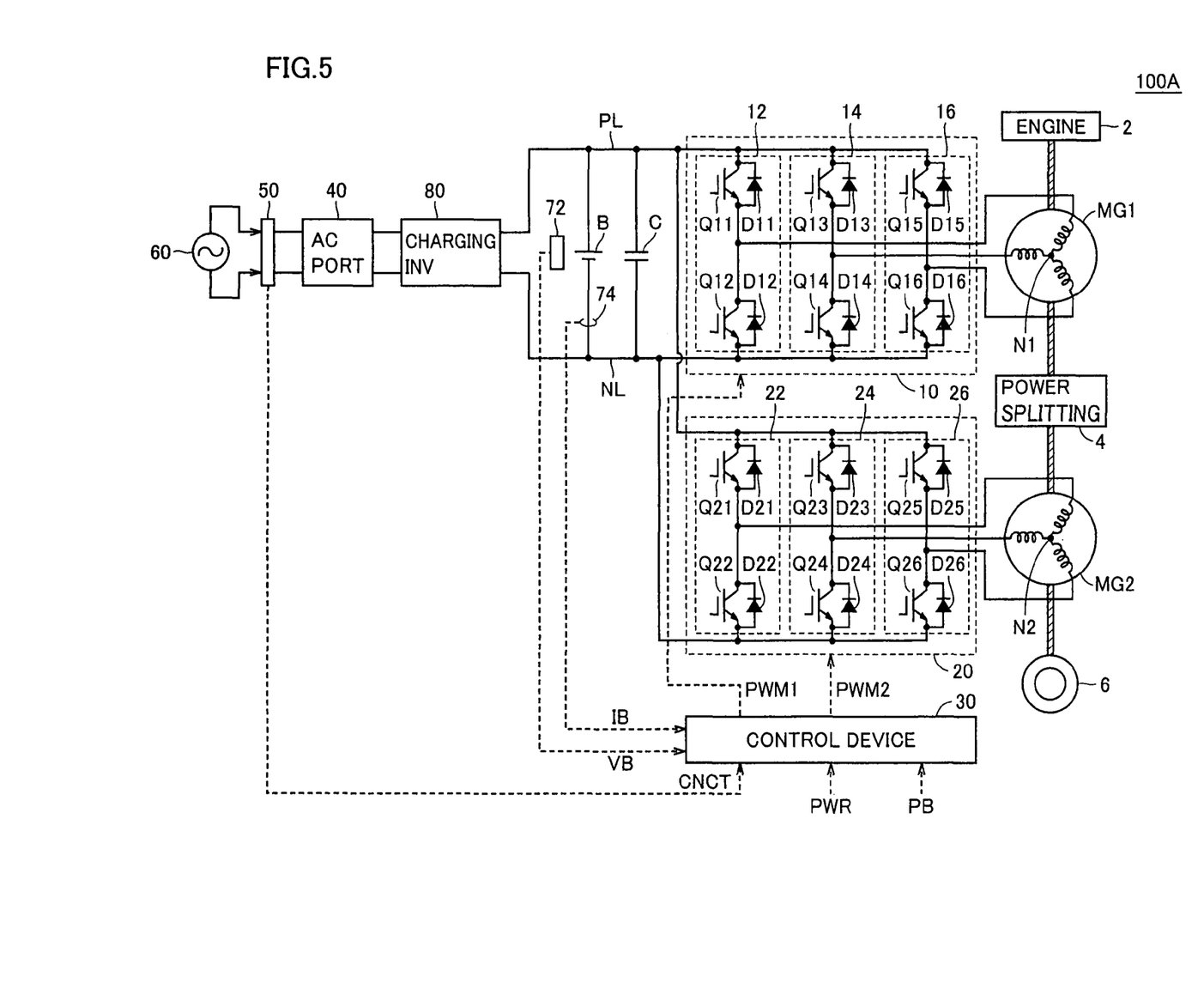
FIG. 5 is an overall block diagram of a vehicle provided with an independent inverter for charging.

FIG. 5 is an overall block diagram of a hybrid vehicle that is shown as an example of a vehicle provided with an independent charging inverter (i.e., inverter for the charging). Referring to FIG. 5, a hybrid vehicle 100A has substantially the same structures as hybrid vehicle 100 shown in FIG. 1 except for that it does not include power lines ACL1 and ACL2 connected to neutral points N1 and N2, but further includes a charging inverter 80.

Charging inverter 80 is connected between AC port 40 and positive and negative lines PL and NL. Charging inverter 80 converts an AC power supplied from power supply 60 via charge plug 50 into a DC power, and provides it to positive and negative lines PL and NL. Thereby, power storage device B connected to positive and negative lines PL and NL can be charged from power supply 60. Other structures of hybrid vehicle 100A are the same as those of hybrid vehicle 100.

Although the embodiment has been described in connection with the case where the key verification is performed as security measures of the vehicle, the invention can be applied to the cases where security measures other than the above are employed. For example, in vehicles that have an authentication system for fingerprint authentication, venous authentication or the like as the security measures, the authentication system may be likewise invalidated when the power storage device is charged from the power supply outside the vehicle, and thereby the system starting operation at the time of charging can be simplified.

In the foregoing embodiment, control device 30 is formed of the plurality of ECUs. However, control device 30 may be formed of a single ECU. Also, some ECUs may be integrated and, for example, power supply ECU 110 and HV-ECU 150 may be formed of a single ECU.

The embodiment has been described in connection with the series/parallel type of hybrid vehicle in which power splitting mechanism 4 splits the power of engine 2 for the axle and the motor generator MG1. However, the invention may be applied to a so-called series type of hybrid vehicle in which engine 2 is used only for driving motor generator MG1, and only motor generator MG2 generates the drive power for the vehicle. Also, the invention may be applied to a motor-assist type of hybrid vehicle in which an engine is used for a primary power and is assisted by an electric motor when necessary. Further, the invention can be applied to an electric vehicle that does not include engine 2 and uses only an electric power for running as well as a fuel cell vehicle provided with a fuel cell in addition to a power storage device.

A converter that performs voltage conversion between power storage device B and inverters 10 and 20 may be arranged between power storage device B and inverters 10 and 20. This converter may be formed of, e.g., a known chopper circuit.

In the above description, the control by control device 30 is executed by a CPU (Central Processing Unit), which reads a program bearing respective steps in the flowchart of FIG. 3 from a ROM (Read Only Memory), and executes the read program to executes the processing according to the flowchart of FIG. 3. Therefore, the ROM corresponds to a computer-readable (CPU-readable) recording medium bearing the program that includes the respective steps of the flowchart shown in FIG. 3.

In the above description, inverters 10 and 20, motor generators MG1 and MG2, power lines ACL1 and ACL2, and HV-ECU 150 form the "charging unit" in the invention. Relay 162 and power supply ECU 110 form the "connection detecting unit" in the invention. Further, immobilizer ECU 120 corresponds to the "authenticating unit" in the invention, and power supply ECU 110 corresponds to the "control unit" in the invention. Furthermore, shift ECU 140 corresponds to the "shift position detecting unit" in the invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A vehicle comprising:
a power storage device capable of being charged;
a charge plug for receiving an electric power for charging said power storage device from a power supply outside the vehicle;
charging means configured to be capable of receiving the electric power input from said charge plug and charging said power storage device;
authenticating means for determining whether a user is a regular user or not, and allowing starting of a vehicle system when it is determined that the user is the regular user; and
control means for starting said vehicle system independently of the determination result of said authenticating means when said power storage device is charged from said power supply.

2. The vehicle according to claim 1, further comprising:
connection detecting means for detecting connection or disconnection between said charge plug and said power supply, wherein
said control means starts said vehicle system independently of the determination result of said authenticating means when said connection detecting means detects the connection between said charge plug and said power supply during stop of said vehicle system.

3. The vehicle according to claim 1, wherein
said control means invalidates the determination result of said authenticating means and instructs said charging means to execute the charging of said power storage device from said power supply, when said power storage device is to be charged from said power supply.

4. A control method for a vehicle allowing charging of a power storage device mounted on the vehicle from a power supply outside the vehicle, wherein
said vehicle includes authenticating means for determining whether a user is a regular user or not, and allowing starting of a vehicle system when it is determined that the user is the regular user, and
said control method comprises:
a step of starting said vehicle system independently of the determination result of said authenticating means when said power storage device is to be charged from said power supply; and
a step of executing the charging of said power storage device from said power supply when said vehicle system starts.

5. The control method according to claim 4, further comprising:
a step of detecting the connection between said power supply and a charge plug receiving the electric power for charging said power storage device from said power supply, wherein
said vehicle system is started in the step of starting said vehicle system independently of the determination result of said authenticating means, when the connection between said charge plug and said power supply is detected during stop of said vehicle system.

6. The control method according to claim 4, further comprising:
a step of invalidating the determination result of said authenticating means at the time of charging said power storage device from said power supply, wherein
said vehicle system starts and the charging of said power storage device from said power supply is executed when the determination result of said authenticating means is invalidated.

7. A vehicle comprising:
a power storage device capable of being charged;
a charge plug for receiving an electric power for charging said power storage device from a power supply outside the vehicle;

a charging device configured to be capable of receiving the electric power input from said charge plug and charging said power storage device; and a control device executing a series of process, wherein said control device determines whether a user is a regular user or not, allows starting of a vehicle system when it is determined that the user is the regular user, and starts said vehicle system independently of a result of the determination whether the user is the regular user or not, at the time of charging said power storage device from said power supply.

8. The vehicle according to claim 7, wherein said control device detects the connection or disconnection between said charge plug and said power supply, and when the connection between said charge plug and said power supply is detected during stop of said vehicle system, said control device starts said vehicle system independently of the result of the determination whether the user is the regular user or not.

9. The vehicle according to claim 8, wherein when said power storage device is to be charged from said power supply, said control device invalidates the result of the determination whether the user is the regular user or not, and instructs said charging device to execute the charging of said power storage device from said power supply.

* * * * *